United States Patent [19]

Uchibori et al.

[11] Patent Number: 5,105,817
[45] Date of Patent: Apr. 21, 1992

[54] ULTRASONIC BLOODSTREAM IMAGING APPARATUS

[75] Inventors: Takanobu Uchibori; Mitsuhiro Kojima, both of Ootawara, Japan

[73] Assignee: Kabushiki Kaisha Toshiba, Kawasaki, Japan

[21] Appl. No.: 362,292

[22] Filed: Jun. 6, 1989

[30] Foreign Application Priority Data

Jun. 8, 1988 [JP] Japan ................. 63-141964

[51] Int. Cl.$^5$ ................. A61B 8/00
[52] U.S. Cl. ................. 128/661.08
[58] Field of Search ......... 128/660.01, 661.07–661.10; 358/78, 87, 112

[56] References Cited

U.S. PATENT DOCUMENTS

| | | | |
|---|---|---|---|
| 4,205,687 | 6/1980 | White et al. | 128/661.07 |
| 4,641,668 | 2/1987 | Namekawa | 128/663 |
| 4,761,740 | 8/1988 | Lipschutz | 128/660.05 X |
| 4,785,402 | 11/1988 | Matsuo et al. | 128/661.08 X |
| 4,794,932 | 1/1989 | Boba | 128/661.09 |
| 4,827,942 | 5/1989 | Lipschutz | 128/661.08 |
| 4,867,167 | 9/1989 | Magnin | 128/661.07 X |
| 4,911,171 | 3/1990 | Uchibori | 128/661.09 |

OTHER PUBLICATIONS

Eyers, M. K. et al., "Color Digital Echo/Doppler Image Presentation", Ultrasound in Medicine & Biology, vol. 7, pp. 21-31, 1981.

Primary Examiner—Francis Jaworski
Attorney, Agent, or Firm—Finnegan, Henderson, Farabow, Garrett and Dunner

[57] ABSTRACT

In the ultrasonic bloodstream imaging apparatus of the present invention, an ultrasonic wave is propagated into a subject, and a tomographic image of the subject is obtained. Then, a bloodstream data image is superimposed on the tomographic image and is displayed with color. A monochrome threshold value is set for tomographic image data obtained from an echo level of the ultrasonic wave. A color threshold value is set for bloodstream data obtained from the ultrasonic wave which has been affected by the Doppler effect. The echo level of the ultrasonic wave and the bloodstream data are compared with the monochrome threshold value and the color threshold value, respectively, and either a monochrome display mode or color display mode is selected based on the comparison result.

5 Claims, 7 Drawing Sheets

ULTRASONIC BLOODSTREAM IMAGING APPARATUS

BACKGROUND OF THE INVENTION

1. Field of the Invention

The present invention relates to an ultrasonic bloodstream imaging apparatus wherein color bloodstream data is superimposed on a monochrome tomographic image.

2. Description of the Related Art

Conventionally, there exists an ultrasonic bloodstream imaging apparatus in which an ultrasonic Doppler method and a pulse reflection method are used in combination to obtain bloodstream data and tomographic image (B-mode image) data with use of a single ultrasonic probe, and the bloodstream data is superimposed on the tomographic image and displayed with color in real time. With this conventional apparatus, the a bloodstream velocity may be measured in the following manner.

An ultrasonic pulse beam is caused to propagate through the blood flowing in a subject or a living body. The ultrasonic beam is scattered by moving blood cells and the center frequency fc of the ultrasonic beam deviates by a frequency component fd due to the Doppler effect. Thus, the received frequency f becomes f=fc+fd. In this case, frequencies fc and fd are given by the following formula:

$$fd \simeq \frac{2V\cos\theta}{C} \cdot fc \qquad (1)$$

where
- v: bloodstream velocity
- θ: angle between the ultrasonic beam and blood vessel
- c: sonic velocity Thus, by detecting the frequency component fd by which the ultrasonic beam deviates due to the Doppler effect, the bloodstream velocity v can be obtained.

Figure 1:
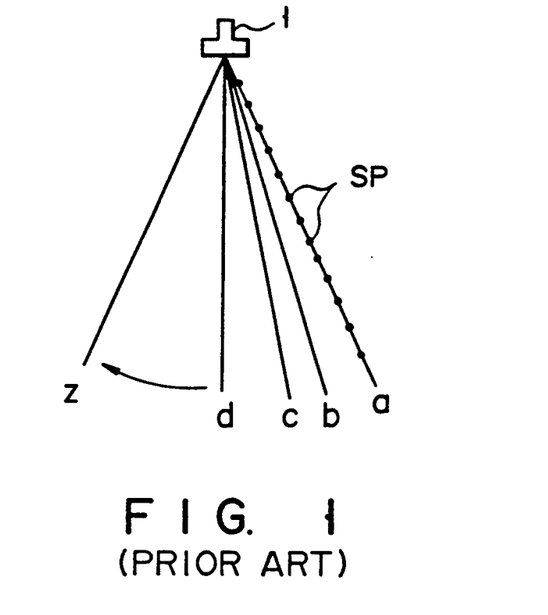
FIG. 1 illustrates the principle of ultrasonic wave scan.
Figure 2:
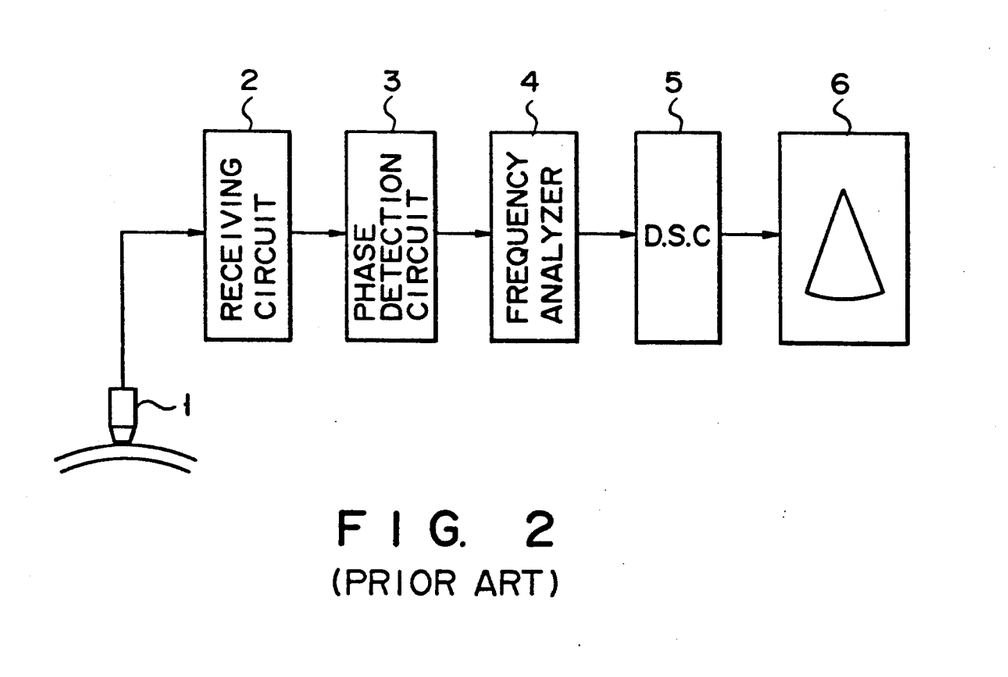
FIG. 2 is a block diagram showing an apparatus for receiving ultrasonic waves sent from a subject and displaying a data image on a display.

Two-dimensional image display of the obtained bloodstream velocity v is performed in the following manner. As shown in FIG. 1, an ultrasonic pulse beam is sequentially propagated from an ultrasonic probe 1 to a subject in directions a, b, c. . . , thereby to perform sector (or linear) scanning. In this case, the ultrasonic pulse scan control is performed by an ultrasonic bloodstream imaging apparatus as shown in FIG. 2.

At first, the ultrasonic pulse beam is emitted in the direction a several times. The beam is scattered by blood cells in the subject and deviates due to the Doppler effect, and the resulting reflected echo signal is received by the same probe 1 and converted to an electric signal. The electric signal is sent to a receiving circuit 2.

Then, a phase detection circuit 3 detects a Doppler deviation signal. The Doppler deviation signal is sampled, for example, at 256 sampling points provided in the direction of the ultrasonic pulse beam. The Doppler deviation signal sampled at each sampling point is analyzed by a frequency analyzer 4 and delivered to a D.S.C. (digital scan converter) 5. In the D.S.C, the signal is scan-converted. The scan-converted signal is supplied to a display 6, and a bloodstream velocity image in the direction a is displayed as a two-dimensional image in real time.

With respect to the directions b, c,. . . , the same operation is repeated, and bloodstream velocity images (flow velocity distribution image) corresponding to the respective scanning directions are displayed. The flow velocity distribution image is color-displayed and a tomographic image is monochrome-displayed (B/W display), in a composite display manner.

In the conventional apparatus, since the monochrome (luminance)-display B- or M-mode image is simply superimposed on the color (luminance)-display bloodstream velocity data image, the hue of a superimposed area at which the echo level is low and the bloodstream velocity is low is disturbed, resulting in an unnatural image. Thus, exact diagnosis cannot be carried out. This is a main drawback of the conventional apparatus.

In addition, the conventional apparatus has the following drawback. When a color bloodstream data image of a heart is obtained, the wall of the heart rapidly moves like the bloodstream and is also displayed with color, as if blood flowed in the wall.

SUMMARY OF THE INVENTION

The object of the present invention is to provide an ultrasonic bloodstream imaging apparatus which has eliminated the drawbacks of the conventional apparatus, and can obtain a natural, exact bloodstream image with no disturbance of hue, even if there is an area at which the echo level is low and the bloodstream velocity is low.

In order to achieve the above object, the ultrasonic bloodstream imaging apparatus of the present invention comprises: means for causing an ultrasonic wave to propagate through a subject, displaying a tomographic image of the subject, and color-displaying a bloodstream data image superimposed on the tomographic image; means for setting a monochrome threshold value of tomographic image data obtained based on an echo level of the ultrasonic wave; means for setting a color threshold value of bloodstream data obtained from the ultrasonic wave which is affected by Doppler deviation; and display control means for comparing the echo level and bloodstream velocity data of the received ultrasonic wave with the monochrome threshold value and the color threshold value, and, based on the comparison result, performing, with priority, either monochrome display or color display.

According to the ultrasonic bloodstream imaging apparatus with the above structure, the monochrome threshold value is set to the tomographic image data and the color threshold value is set to the bloodstream image data. The data obtained by causing the ultrasonic wave to propagate through the subject is compared with the monochrome threshold value and the color threshold value, thus selecting, with priority, either the monochrome display or color display. Thus, the monochrome display or color display is suitably selected for an image of the area at which the echo level is low and the bloodstream velocity is low. As a result, the hue of this area is not disturbed, and exact diagnosis can be performed with use of natural images.

In addition, in the ultrasonic bloodstream imaging apparatus of the present invention, the above-mentioned color threshold value may be replaced with two variable color threshold values. Only a region defined by the two color threshold values and the monochrome threshold value may be displayed with color, and the other region may be displayed in black and white. In this case, only a region where the bloodstream velocity is low, or only a region where the bloodstream velocity is high, or only a given narrow region can be selectively displayed with color. Thus, the diagnosis is made more reliable.

DETAILED DESCRIPTION OF THE PREFERRED EMBODIMENTS

An embodiment of an ultrasonic bloodstream imaging apparatus according to the present invention will now be described with reference to the accompanying drawings.

Figure 3:
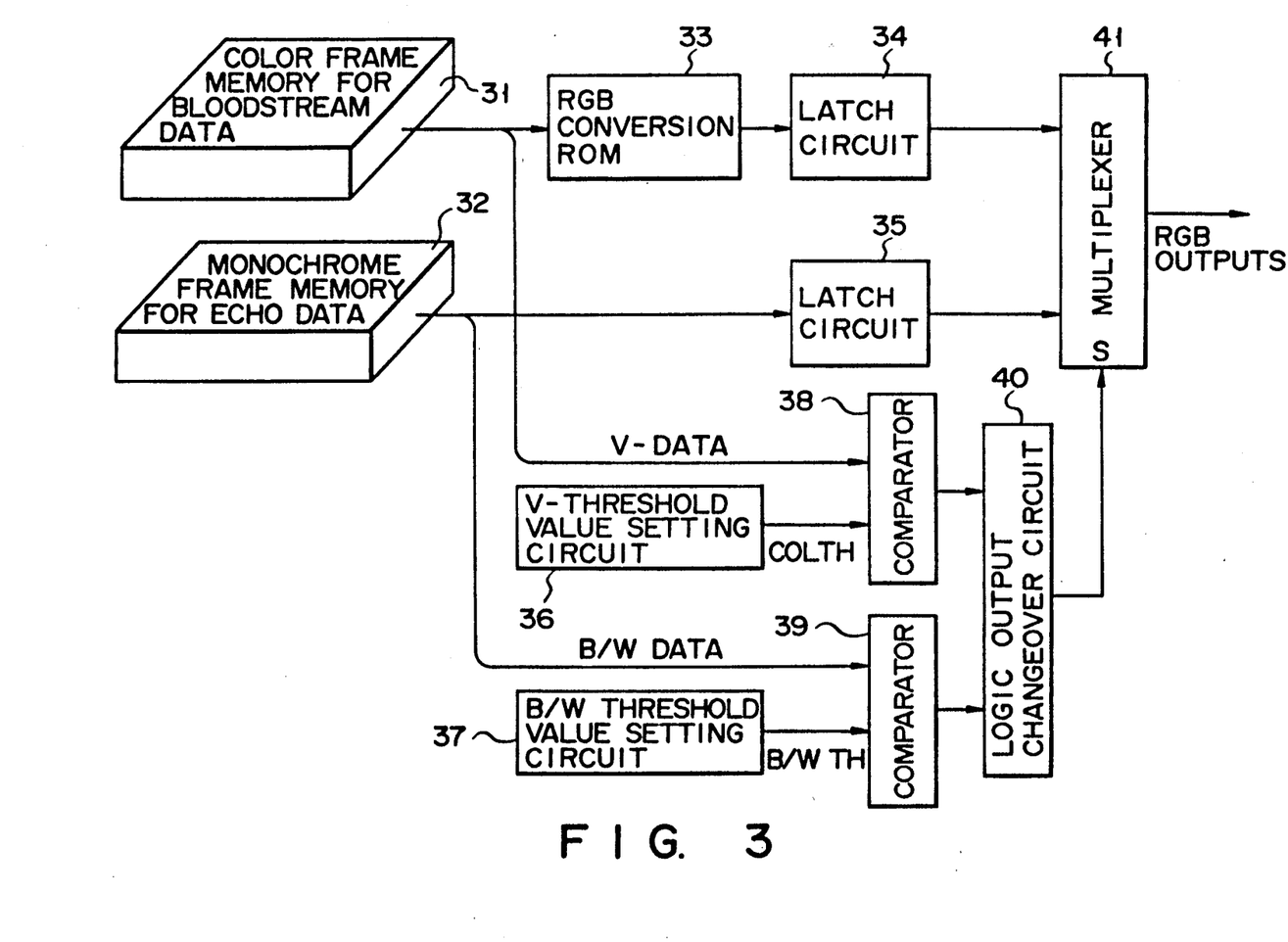
FIG. 3 is a block diagram showing an embodiment of an ultrasonic bloodstream imaging apparatus according to the present invention.

FIG. 3 is a block diagram showing an important portion of the embodiment. In FIG. 3, a color frame memory 31 for bloodstream data stores bloodstream digital data obtained from echo data included in an ultrasonic wave reflected from a subject. A monochrome frame memory 32 for echo data stores echo digital data for forming, for example, a B-mode image, which is included in the reflected ultrasonic wave.

An RGB conversion ROM (read-only memory) 33 converts the bloodstream data read out from the color frame memory 31 to an RGB signal in accordance with the magnitude of the bloodstream data. A latch circuit 34 temporarily retains the RGB signal representative of the bloodstream data read out from the ROM 33. Another latch circuit 35 temporarily retains the echo data read out from the monochrome frame memory 32.

A V-threshold value setting circuit 36 sets a color luminance threshold value for forming a two-dimensional bloodstream velocity image. This threshold value can be freely chosen. A comparator 38 compares the color luminance threshold value COLTH fed from the V-threshold value setting circuit 36 with the bloodstream velocity V-data fed from the color frame memory 31. When the bloodstream velocity V-data is greater than the color luminance threshold COLTH, the comparator 38 outputs an H-level signal. On the other hand, when the bloodstream velocity V-data is smaller than the color luminance threshold COLTH, the comparator 38 outputs an L-level signal. The relationship between the input signals and the output signal of the comparator 8 will be shown in Table 1.

TABLE 1

| Bloodstream Velocity Data V | Output of Comparator 38 |
| --- | --- |
| >COLTH | H |
| <COLTH | L |

A B/W threshold value setting circuit 37 sets a monochrome (black-and-white) luminance threshold value of echo data for forming, for example, a B-mode image. This threshold value can be freely chosen. A comparator 39 compares the monochrome luminance threshold value B/WTH fed from the B/W threshold value setting circuit 37 with the echo data B/W fed from the monochrome frame memory 32. When the echo data B/W is greater than the monochrome luminance threshold value B/WTH, the comparator 39 outputs an H-level signal. When the echo data B/W is smaller than the monochrome luminance threshold value B/WTH, the comparator 39 outputs an L-level signal. The relationship between the inputs and output of the comparator 39 will be shown in Table 2.

TABLE 2

| B/W Data | Output of Comparator 39 |
| --- | --- |
| >B/W-TH | H |
| <B/W-TH | L |

A logic output changeover circuit 40 receives the outputs from the comparators 38 and 39 and outputs a select signal to an input terminal S of a multiplexer 41 (described later) based on the input/output relationship shown in the below Table 3. Only when the output of the comparator 38 is in "H" level and the output of the comparator 39 is in "L" level, the logic output changeover circuit 40 outputs an "H" signal. In other cases, the circuit 40 outputs an "L" signal.

TABLE 3

| Output of Comparator 38 | Output of Comparator 39 | Output of Switching Logic Generating Circuit 40 |
| --- | --- | --- |
| L | L | L |
| L | H | L |
| H | L | H |
| H | H | L |

The multiplexer 41 selects the output of the latch circuit 34 or the output of latch circuit 35 in accordance the select signal supplied from the logic output changeover circuit 40, based on the relationship shown in the below Table 4, and the multiplexer 41 outputs RGB signals. In other words, when the input S of multiplexer 41 is "L", the multiplexer 41 delivers the output of the latch circuit 35 for echo data (B- or M- mode image). When S = "H", the multiplexer 41 delivers the output of the latch circuit 34 for bloodstream data (bloodstream velocity image).

TABLE 4

| Input S of Multiplexer 41 | Output of Multiplexer 41 |
| --- | --- |
| L | Output of Latch Circuit 34 |
| H | Output of Latch Circuit 35 |

The operation of the embodiment having the above structure will now be described. When the bloodstream velocity V-data is smaller than the color luminance threshold value COLTH, the comparator 38 outputs a "L" signal, and when the echo data B/W is smaller than the monochrome luminance threshold B/WTH, the comparator 39 outputs an "L" signal. In this case, the logic output changeover circuit 40 outputs an "L" signal. According to Table 4, the multiplexer 41 receives the output of the latch circuit 35 and, therefore, outputs the contents of the monochrome frame memory 32 for echo data. Thus, a B- or M-mode image is displayed in black and white.

Similarly, when V<COLTH and B/W>B/WTH, the B- or M-mode image is displayed in black and white.

When V>COLTH and B/W<B/WTH, a bloodstream velocity image is displayed with color in a two-dimensional manner.

When V>COLTH and B/W>B/WTH, the B- or M-mode image is displayed in black and white.

Figure 4:
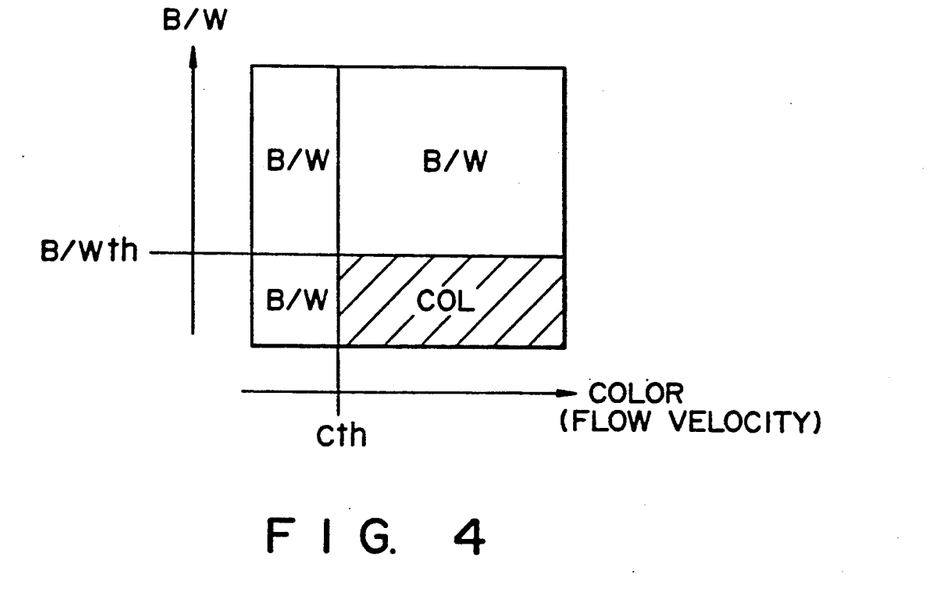
FIG. 4 is a view for explaining the principle of composite display employed in the ultrasonic wave bloodstream imaging apparatus of the present invention, wherein a monochrome threshold value is set for a tomographic image data obtained from the received ultrasonic wave, and a color threshold value is set for a bloodstream image data.

This relationship is shown in FIG. 4. The monochrome luminance display or color luminance display is selected with priority, based on the relationship in magnitude between the echo level B/W and the monochrome luminance threshold B/WTH and the relationship in magnitude between the bloodstream velocity V-data and the color luminance threshold value COLTH.

As described above, according to this embodiment, even in a region where an echo level is low and bloodstream velocity is low, such as a boundary between a blood vessel wall and a bloodstream, a natural, clear image can be displayed without disturbance of hue, and exact diagnosis can be performed.

Since the monochrome luminance threshold value B/WTH for determining the monochrome luminance display and the color luminance threshold value COLTH for determining the color luminance display can be set to desired values, a natural, clear image of blood cells of high bloodstream velocity, as in the heart, as well as blood cells of low bloodstream velocity, as in the abdomen, can be displayed with no disturbance in hue. As a result, diagnosis of the liver or kidney in which the bloodstream velocity is low can be improved.

In this embodiment, the monochrome threshold value can be set, as shown in FIG. 4. If this technique is employed, even if the wall of the heart, for example, moves rapidly like the bloodstream, the movement of the wall of the heart can be distinguished from the bloodstream. In other words, the wall of the heart, when compared to the bloodstream, emits a stronger echo signal which has a value higher than the monochrome threshold value. Thus, even if the area where the B/W level is higher than the monochrome threshold value moves rapidly, it can be recognized that the rapid movement of the area is not due to the bloodstream.

In a simple superimposing technique of the prior art, a dynamic range of a B- or M-mode image of an area which is displayed with color luminance is narrowed. In contrast, in the present invention, the dynamic range is not narrowed, resulting in desirable diagnosis.

In the above embodiment, the monochrome display and color display may be performed by using factors other than the luminance.

Another embodiment of the ultrasonic bloodstream imaging apparatus of the present invention will now be described with reference to FIGS. 5 to 9. In this embodiment, two color threshold values are provided.

Figure 5:
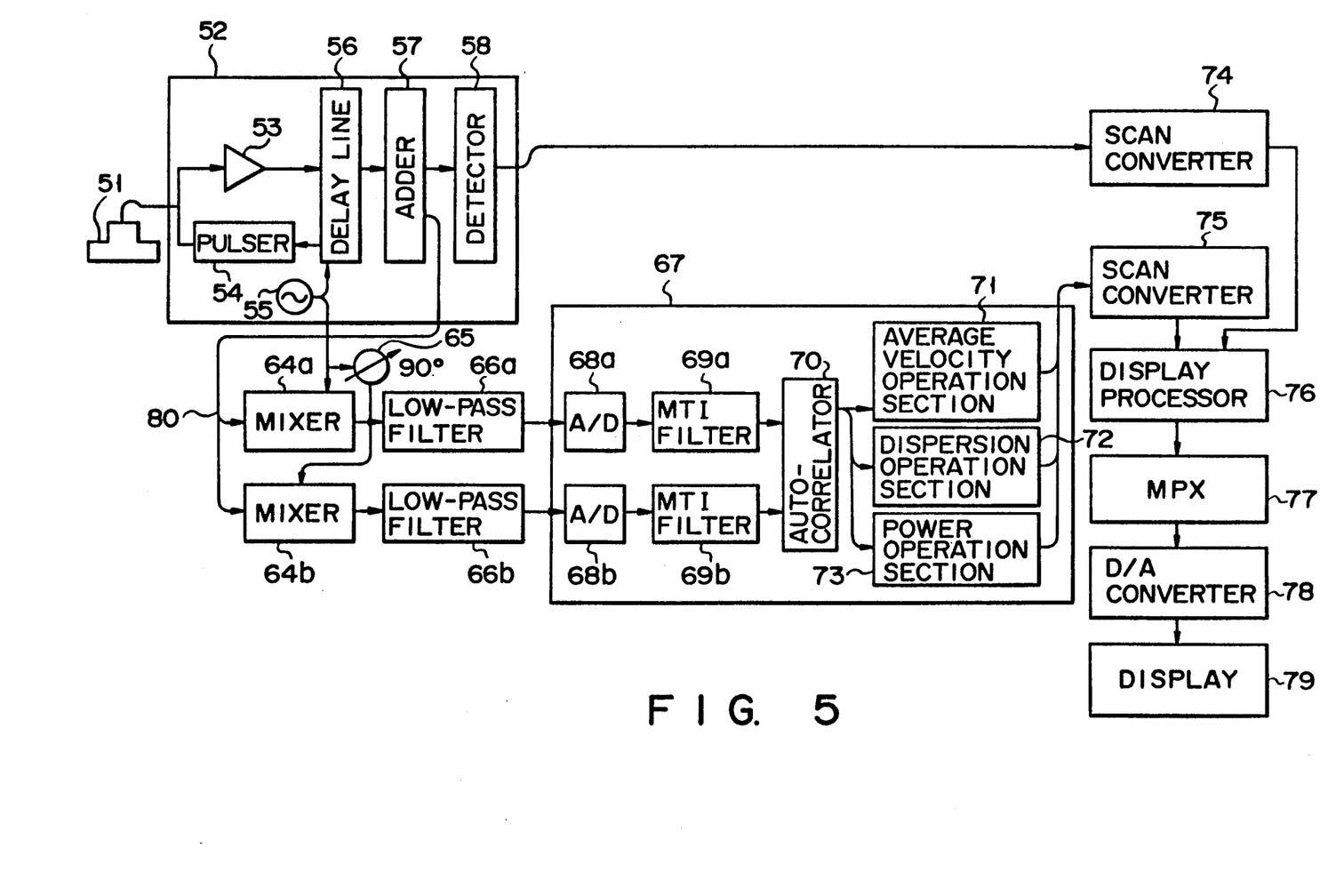
FIG. 5 is a block diagram showing a structure for the ultrasonic bloodstream imaging apparatus of the present invention.

The apparatus shown in FIG. 5 comprises an electronic scan type ultrasonic probe (hereinafter, referred to as "probe") 51, an electronic scan analog section 52, a 90° phase-shifter 65, mixers 64a and 64b, low-pass filters 66a and 66b, an MTI (moving target indicator) operation section 67, digital scan converters 74 and 75, a display processor 76, a multiplexer (MPX) 77, a digital-to-analog (D/A) converter 78, and a display 79.

The electronic scan analog section 52 includes a preamplifier 53, a pulser 54, an oscillator 55, a delay line 56, an adder 57, and a detector 58.

One of the output signals of the adder 57 is supplied to the scan converter 74 through the detector 58, and the other is supplied through a line 80 and supplied to the mixers 64a and 64b. The mixer 64a it is, and the other mixer 64b receives a phase-shifted reference signal for which is also supplied from the oscillator 55 but is phase-shifted by 90° through the phase-shifter 65. As a result, a Doppler deviation signal fd and a (2fo+fd) signal are input to the low-pass filters 66a and 66b. The low-pass filters 66a and 66b eliminate high-frequency components and output only the Doppler deviation signals fd, which serve as phase detection output signals for arithmetic operation of bloodstream data.

The phase detection output signals supplied from the low-pass filters 66a and 66b are delivered to the MTI operation section 67.

The MTI operation section 67 includes A/D converters 68a and 68b, MTI filters 69a and 69b, an autocorrelator 70, an average velocity operation section 71, a dispersion operation section 72, and a power operation section 73. The MTI (moving target indicator) is often used in radar systems to detect a target by utilizing the Doppler effect. In this embodiment, the moving targets are blood cells.

The autocorrelator 70 is a kind of frequency analyzer, and is used to perform frequency analysis of a number of points in a two-dimensional plane in real time.

The average velocity operation section 71, dispersion operation section 72, and power operation section 73 perform predetermined arithmetic operations to find bloodstream velocity, ultrasonic dispersion, and the power of the bloodstream.

An output of the MTI operation section 67 is delivered to a display processor 76 through the scan converter 75. In the scan converter 75, the output of the MTI operation section 67 is processed for the monochrome display and color display, and the processed signal is supplied to the MPX 77.

A specific structure of the display processor 76 and its peripheral sections will now be described with reference to FIG. 6.

Figure 6:
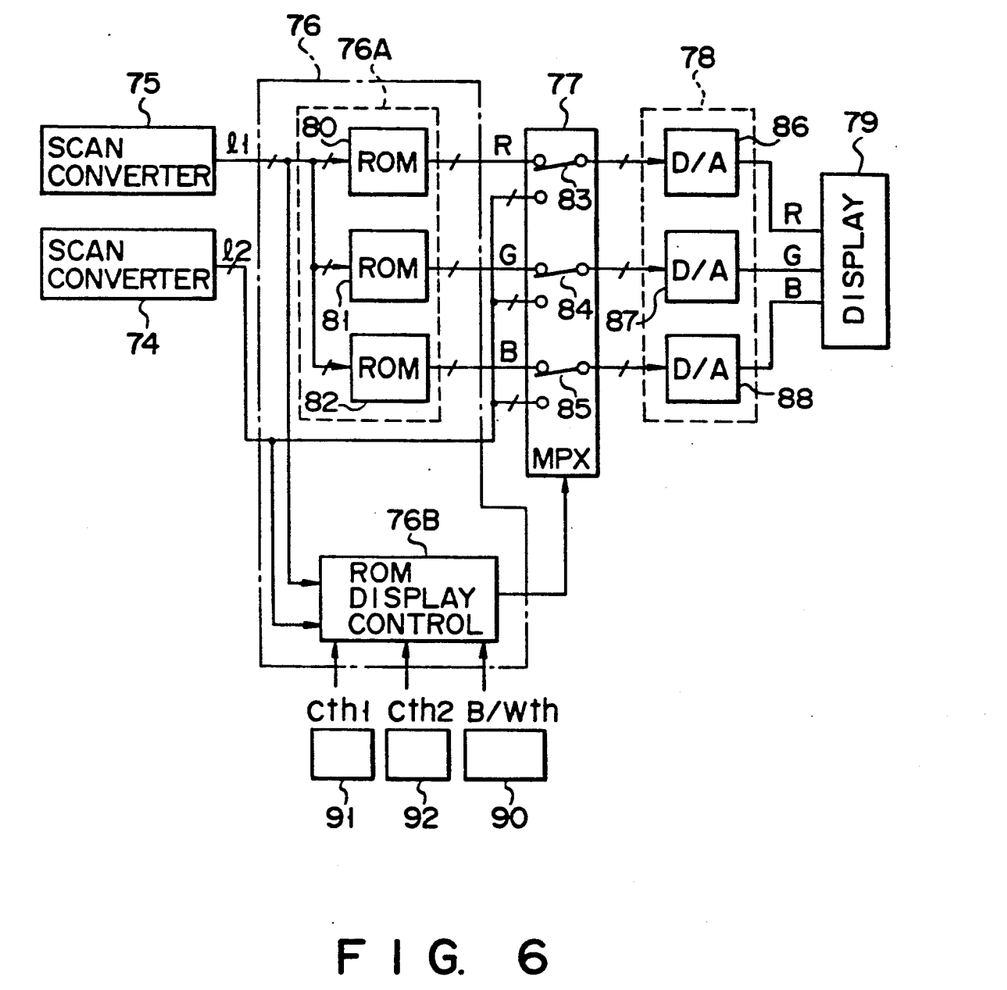
FIG. 6 shows a specific structure of an important portion of the embodiment shown in FIG. 5.

As shown in FIG. 6, the display processor 76 comprises a color converter 76A for converting the output signal of the scan converter 75 to color signals, and a display control 76B for comparing the signals supplied from the scan converters 74 and 75 (as will be described later) and controlling the multiplexer (MPX) 37 based on the comparison result. The display control 76B is formed of a ROM (read-only memory), but it may also be formed of a PAL (programmable array logic) or the like.

The MPX 77 has three switches 83, 84, and 85. The changeover functions of the switches compound the outputs of the scan converter 74 (B-mode data) and the color converter 76A.

The color converter 76A comprises ROMs 80, 81, and 82. Each ROM receives the output from the scan converter 75. The ROMs 80, 81, and 82 convert dispersion and power data based on bloodstream data to digital signals representative of the luminance of red (R), green (G), and blue (B) displayed on a display 79. Based on the data stored in the ROMs, various color displays are made possible.

The display control 76B compares the outputs from the scan converters 74 and 75 in relation to a monochrome threshold value B/Wth and color threshold 91, and 92. By this operation, the display control 76B synthesizes the monochrome display and the color display, and controls the switches in the MPX 77.

Figure 7:
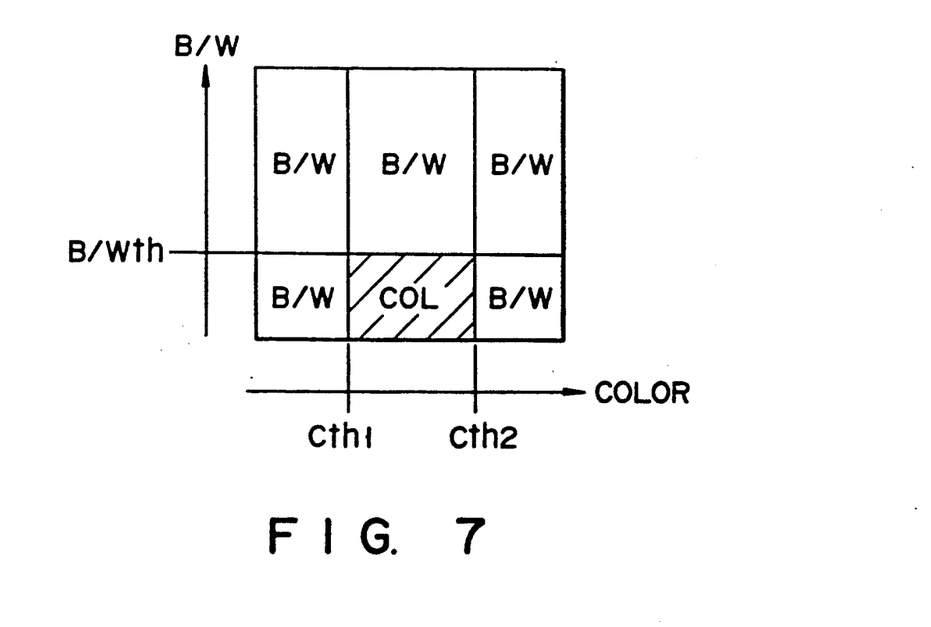
FIG. 7 is a view for explaining the principle of composite display wherein two color threshold values are set for the bloodstream image data.

With reference to FIG. 7 and FIGS. 8(a) to 8(c), the principle of the synthesis of the monochrome display and the color display will be described. The principle of the monochrome/color synthesis of the present invention is characterized by the provision of two color threshold values, as shown in FIG. 7. Namely, though only one threshold value for B/W luminance is provided in the ordinate, as in the prior art, two different threshold values Cth1 and Cth2 for color display (bloodstream velocity) are provided in the abscissa. An area defined by three threshold setting lines (shown by hatching) is color-displayed, and the other area is monochrome-displayed. Control signals obtained by this principle of monochrome/color synthesis are supplied to the switches in the MPX77. This process will be described later with reference to the flow chart shown in FIG. 9.

Figure 8A:
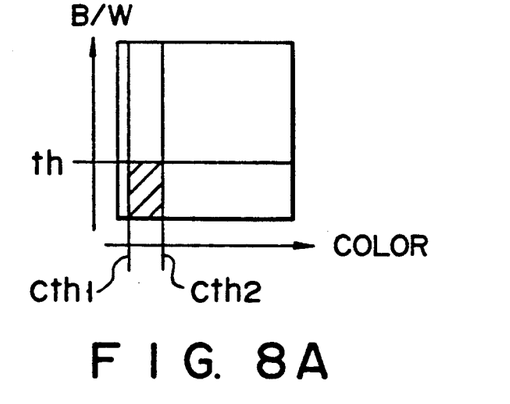
FIGS. 8A to 8C show examples in which two color threshold values are set.
Figure 8B:
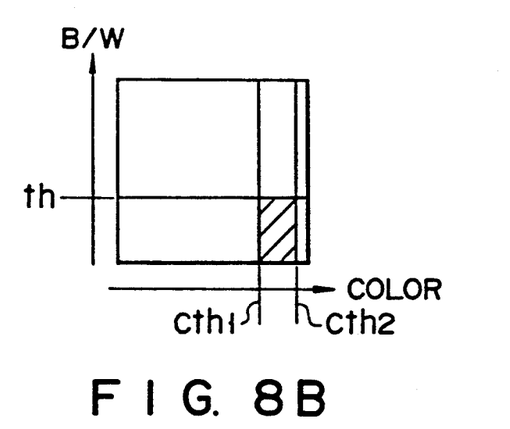
Figure 8C:
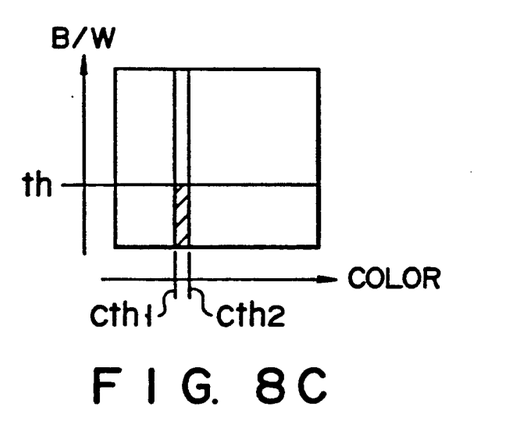

The color threshold values can be freely set by an external element, as shown in FIGS. 8A to 8C. In FIG. 8A, the color threshold values Cth1 and Cth2 are set so as to emphasize only a low-velocity range of bloodstream. In FIG. 8B, the color thresholds are set so as to emphasize a high-velocity range of bloodstream. In FIG. 8C, only a narrow velocity range of bloodstream is emphasized. In this manner, a desired velocity range of bloodstream can be displayed with color.

The operation of the above apparatus will now be described.

The electronic scan analog section 52 performs scanning to obtain a B-mode image data of a subject. The obtained B-mode image data is scan-converted by the scan converter 74, and the resulting data is sent to the display 79 through display processor 76, MPX 77, and D/A converter 78, so that the data is monochrome-displayed in black and white.

Doppler data, sampled simultaneously with the B-mode image data, is sent to the MTI operation section 67 through the adder 57, mixers 64a and 64b, and low-pass filters 66a and 66b. In the MTI operation section 67, the average velocity operation section 71, dispersion operation section 72, and power operation section 73 perform given arithmetic operations, and the result of the operations is delivered to the display processor 76 through the scan converter 75.

The output of the display processor 76 selectively operates the switches in the MPX 77, thus synthesizing the above-mentioned monochrome display and the color display. The display control operation will now be described with reference to the flow chart shown in FIG. 9.

Figure 9:
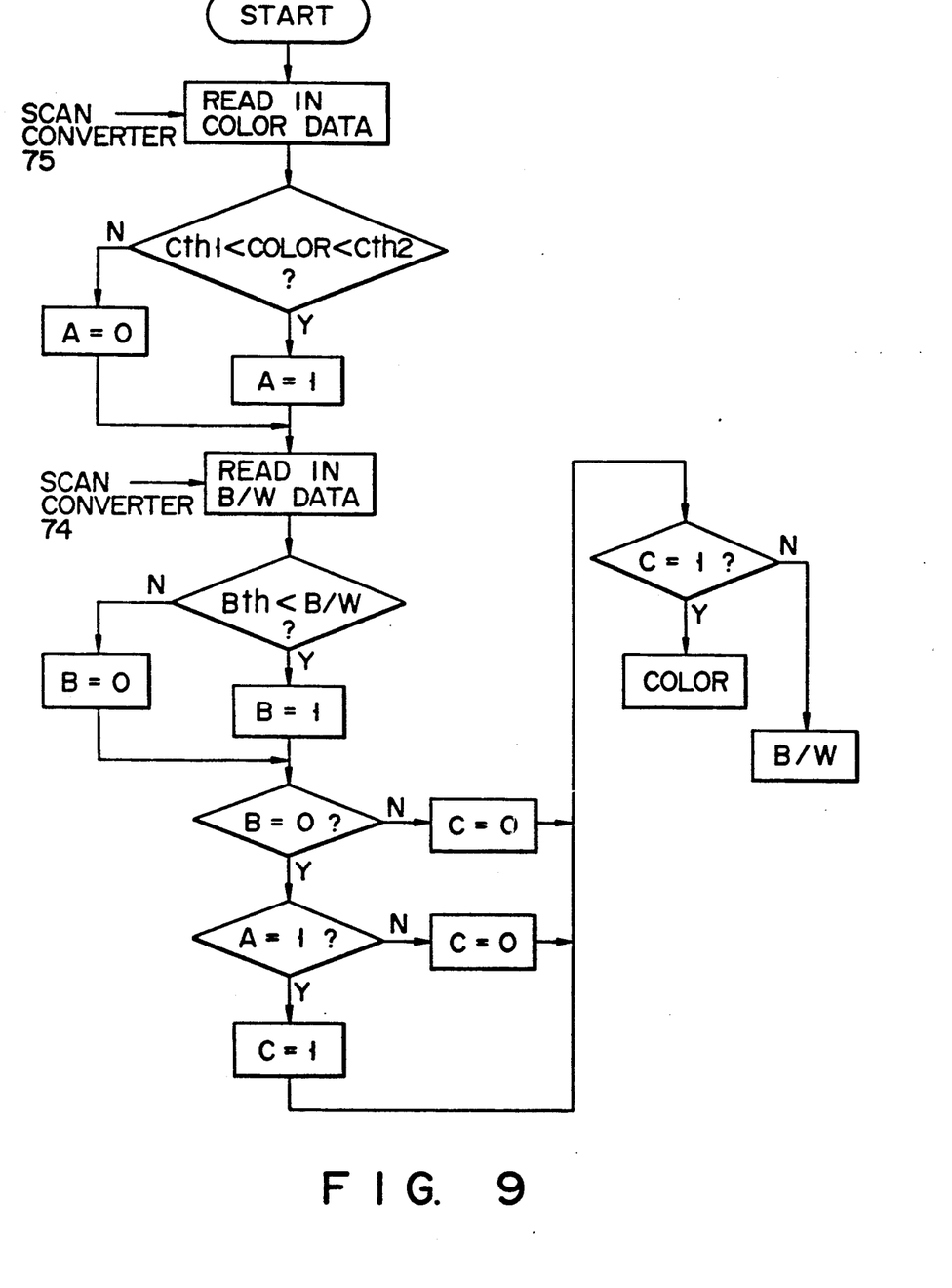
FIG. 9 is a flow chart for explaining the operation of the apparatus in which two color threshold values are set.

At first, color data representative of bloodstream velocity is read in, and it is judged whether or not the color data falls within a range between two color threshold values. If it falls within the range, a flag of $A=1$ is output, and if it does not, a flag of $A=0$ is output. Then, monochrome display B/W data is read in, and it is judged whether or not the B/W data is equal to or higher than the monochrome threshold value Bth. If it is, a flag of $B=1$ is output, and if it is not, a flag of $B=0$ is output. Thereafter, judgment with respect to each flag is made. Unless $B=0$, a flag of $C=0$ is output. If $B=0$, it is then judged whether or not $A=1$. Unless $A=1$, a flag of $C=0$ is output. If $A=1$, a flag of $C=0$ is output. In this manner, the data with the flag of $C=1$ is used for color display, and the data with the flag of $C=0$ is used for monochrome display.

What is claimed is:
1. An ultrasonic imaging apparatus comprising:
   ultrasonic transmitting and receiving means for transmitting an ultrasonic wave to a subject and receiving reflection echo of the ultrasonic wave from the subject;
   means for obtaining monochrome tomographic image information of the subject on the basis of the reflection echo from the subject;
   means for obtaining bloodstream velocity information from a Doppler shift signal obtained from the reflection echo of the subject;
   means for setting a monochrome threshold value according to said tomographic image information;
   means for setting a color threshold value according to said bloodstream image information;
   control means for selecting either a monochrome display mode of the tomographic image information or a color display mode of the bloodstream information, based on the comparison result of said tomographic image information and the monochrome threshold value and on the comparison result of said bloodstream velocity information and the color threshold value; and
   display means for displaying the display information in the mode selected by said control means.
2. The ultrasonic imaging apparatus according to claim 1, wherein said display means monochromically displays the tomographic image when the bloodstream velocity data is higher than said set color threshold value and the value of the tomographic image information is higher than said set monochrome threshold value, said display control means displays said bloodstream data in color when said bloodstream velocity data is higher than the color threshold value and the value of the tomographic image information is lower than the monochrome threshold value, and said display control means monochromically displays the tomographic image when said bloodstream velocity value is lower than said color threshold value.
3. The ultrasonic imaging apparatus according to claim 1, wherein at least one of said monochrome threshold value and said color threshold value is variable.
4. An ultrasonic imaging apparatus comprising:
   means for causing an ultrasonic wave to propagate through a subject;
   means for displaying a monochrome tomographic data image of the subject; and means for displaying a bloodstream data image in color;

means for setting a monochrome threshold value according to the tomographic data;

means for setting a maximum and a minimum color threshold value according to the bloodstream data; and display control means for displaying the bloodstream data in color only if the bloodstream data is greater than the minimum color threshold value, if the bloodstream data is less than the maximum color threshold value, and if the tomographic data is less than the monochrome threshold value.

5. The ultrasonic imaging apparatus according to claim 4, wherein said maximum and minimum color threshold values are variable, and said display control means displays in color only a desired range of bloodstream having a given bloodstream velocity.

* * * * *

UNITED STATES PATENT AND TRADEMARK OFFICE
CERTIFICATE OF CORRECTION

PATENT NO. : 5,105,817
DATED : April 21, 1992
INVENTOR(S) : Takanobu Uchibori et al.

It is certified that error appears in the above-identified patent and that said Letters Patent is hereby corrected as shown below:

Claim 2, column 8, line 47, before "means" insert --control--.

Signed and Sealed this

Fifth Day of October, 1993

BRUCE LEHMAN

*Attest:*

*Attesting Officer*   Commissioner of Patents and Trademarks